United States Patent
Xu et al.

(10) Patent No.: US 12,018,780 B2
(45) Date of Patent: Jun. 25, 2024

(54) SPLIT PULSE TUBE CONNECTING LINE

(71) Applicant: Sumitomo (SHI) Cryogenics of America, Inc., Allentown, PA (US)

(72) Inventors: Mingyao Xu, Allentown, PA (US); Tian Lei, Allentown, PA (US); Ralph C. Longsworth, Mount Desert, ME (US)

(73) Assignee: SUMITOMO (SHI) CRYOGENICS OF AMERICA, INC., Allentown, PA (US)

( * ) Notice: Subject to any disclaimer, the term of this patent is extended or adjusted under 35 U.S.C. 154(b) by 550 days.

(21) Appl. No.: 17/213,635

(22) Filed: Mar. 26, 2021

(65) Prior Publication Data
US 2021/0301957 A1    Sep. 30, 2021

Related U.S. Application Data (60) Provisional application No. 63/001,701, filed on Mar. 30, 2020.

(51) Int. Cl.
*F16L 11/15* (2006.01)
*F16L 25/00* (2006.01)

(52) U.S. Cl.
CPC ....... *F16L 25/0018* (2013.01); *F16L 25/0063* (2013.01); *F16L 11/15* (2013.01)

(58) Field of Classification Search
CPC .... F16L 25/0018; F16L 25/0063; F16L 11/11; F16L 11/15

USPC ........ 138/121, 122, 118; 285/379, 374, 363, 285/369, 377
See application file for complete search history.

(56) References Cited

U.S. PATENT DOCUMENTS

| | | | | |
|---|---|---|---|---|
| 2,870,792 A | * | 1/1959 | Penrose | H01B 7/20 138/121 |
| 4,269,234 A | | 5/1981 | Johnson et al. | |
| 4,362,187 A | * | 12/1982 | Harris | B29C 69/002 277/625 |

(Continued)

FOREIGN PATENT DOCUMENTS

| CN | 202955356 U | 5/2013 |
|---|---|---|
| DE | 10244107 A1 | 4/2004 |

(Continued)

OTHER PUBLICATIONS

International Search Report and Written Opinion of the International Searching Authority dated Jul. 9, 2021, from the corresponding International Application No. PCT/US2021/024163.

(Continued)

*Primary Examiner* — Patrick F Brinson
(74) *Attorney, Agent, or Firm* — KATTEN MUCHIN ROSENMAN LLP (57) ABSTRACT

Losses in the connecting line between the Pressure Wave Generator and the cold head of a GM type pulse tube refrigerator, are reduced while maintaining or improving upon the desirable features of a standard corrugated hose (Continued)

connecting line including vibration isolation, separation distance, and mounting convenience. The basic means are to reduce the internal void volume of the convolutions in a corrugated hose in combination with reducing the number of corrugations, adding fillers to the void volumes, and vibration absorbing coatings.

8 Claims, 5 Drawing Sheets

(56) References Cited

U.S. PATENT DOCUMENTS

| | | | | |
|---|---|---|---|---|
| 5,429,398 | A * | 7/1995 | Lupke | F16L 47/08 |
| | | | | 285/915 |
| 6,260,584 | B1 * | 7/2001 | Foti | F16L 33/207 |
| | | | | 285/903 |
| 6,712,098 | B2 * | 3/2004 | Sakazaki | F16L 33/01 |
| | | | | 138/155 |
| 7,628,022 | B2 | 12/2009 | Spoor et al. | |
| 7,942,456 | B2 * | 5/2011 | Duggan | F16L 21/035 |
| | | | | 285/382 |
| 9,157,668 | B2 | 10/2015 | Xu | |
| 9,982,840 | B2 | 5/2018 | Wikus et al. | |
| 9,995,510 | B2 | 6/2018 | Wikus et al. | |
| 10,066,855 | B2 | 9/2018 | Xu et al. | |
| 10,401,447 | B2 | 9/2019 | Wikus et al. | |
| 2004/0041347 | A1 * | 3/2004 | Beach | F16L 21/03 |
| | | | | 277/314 |
| 2005/0211326 | A1 | 9/2005 | Hibino et al. | |
| 2008/0264509 | A1 | 10/2008 | Weiss et al. | |
| 2010/0089480 | A1 * | 4/2010 | Sahu | F16L 11/15 |
| | | | | 29/458 |
| 2014/0246852 | A1 * | 9/2014 | Gibb | F16L 25/14 |
| | | | | 285/337 |
| 2015/0240974 | A1 * | 8/2015 | Gamble | F16L 25/0054 |
| | | | | 277/612 |
| 2017/0328508 | A1 | 11/2017 | Cardona | |

FOREIGN PATENT DOCUMENTS

| | | |
|---|---|---|
| DE | 102005014128 A1 | 11/2005 |
| EP | 1563216 B1 | 2/2012 |
| EP | 1398554 B1 | 4/2015 |
| EP | 3578862 A1 | 12/2019 |
| GB | 2391926 A | 2/2004 |
| JP | S52-006766 A | 2/1977 |
| JP | S56-141285 U | 10/1981 |
| JP | S62-034285 U | 2/1987 |
| JP | H07-294037 A | 11/1995 |
| JP | 2001-182872 A | 7/2001 |
| JP | 2004-076929 A | 3/2004 |
| JP | 2009-526962 A | 7/2009 |
| JP | 2017-003136 A | 1/2017 |
| JP | 2017-083028 A | 5/2017 |
| JP | 2020-020376 A | 2/2020 |

OTHER PUBLICATIONS

International Preliminary Report on Patentability dated Oct. 13, 2022, from the corresponding International Application No. PCT/US2021/024163.
Notice of Reasons for Rejection dated Dec. 5, 2023, from Japanese Patent Application No. 2022-560015, 5 sheets.
Communication pursuant to Rule 164(1) EPC and partial supplementary European search report dated Mar. 15, 2024, from European Application No. 21782380.6, 13 sheets.
Decision to Grant dated Apr. 23, 2024, from Japanese Patent Application No. 2022-560015, 3 sheets.

* cited by examiner

SPLIT PULSE TUBE CONNECTING LINE

CROSS REFERENCE TO RELATED APPLICATIONS

This application claims the priority of U.S. Provisional Application Ser. No. 63/001,701, filed on Mar. 30, 2020, which is hereby incorporated herein by reference in its entirety.

BACKGROUND

1. Field of the Invention

Embodiments described herein related to minimizing losses associated with a connecting line that separates the valve mechanism of Gifford-McMahon (GM) type pulse tube refrigerator from the cold head which cools a device at a cryogenic temperature. Improvements in the connecting line between the valve motor and cold head increase available cooling and reduce the transmission of vibration.

2. Background Information

Some devices in use today and new ones being developed operate at or below 4 K and require about 1 W of cooling and a low level of vibration. GM type pulse tube refrigerators are being used because they can be built with no moving parts in the cold head. GM type pulse tube expanders produce refrigeration at cryogenic temperatures by cycling gas, typically helium, in and out of the cold head between high and low pressures, typically around 2.2 and 0.8 MPa, and 1 to 2 Hz. A single stage, pulse tube cold head comprises a regenerator having a warm end and a cold end, a cold end heat station, a pulse tube having a warm end and a cold end, and a pressure phase shifting mechanism connected to the warm end of the pulse tube. Gas cycles in and out of the warm end of the regenerator and flows through the cold end heat station as it pressurizes and depressurizes the gas in the pulse tube. The gas flowing in and out of the warm and cold ends of the pulse tube flows through flow smoothers that result in the gas being stratified (it does not mix). The gas entering the warm and cold ends of the pulse tube cause the gas that remains in the pulse tube to act as a compressible piston. One can think of the gas that cycles in and out of the cold end as acting against the end of a solid piston and moving about fifteen percent (15%) of the way into the pulse tube. The P-V diagram is similar to that of a GM or Stirling cycle expander with a solid piston.

Pressure cycling in a GM type pulse tube is provided by a continuous flow compressor with a supply line at high pressure and a return line at low pressure connected to a valve mechanism that cycles the gas to the cold head. In an integrated expander the valve mechanism and cold head are coupled together. In a split pulse tube expander the valve mechanism is separated from the cold head by a connecting line which is sometimes flexible, and referred to as a flex line, and sometimes a tube. Small diameter lines that have an inside diameter of less than about 3 mm are usually made of tubing while larger diameters are typically made of corrugated hose.

The compressor and valve mechanism of a GM type pulse tube is sometimes referred to as a pressure wave generator (PWG). This terminology derives from the Stirling type pulse tube in which a reciprocating piston compressor is coupled to a pulse tube cold head through a connecting line, or connecting tube, and the compressor is referred to as a pressure wave generator. The Stirling type pulse tubes typically run at high speeds, e.g., 60 Hz, so the energy of expansion of the gas in the cold head can be recovered and stored as kinetic energy in the compressor piston(s). The GM type pulse tube operates typically at 1 to 2 Hz and does not recover the energy of expansion, but, can be designed to get colder than a Stirling type pulse tube. The Stirling type pulse tube on the other hand can be much smaller and have a higher efficiency at higher temperatures.

GM type pulse tubes that operate at very low temperatures, e.g., 4 K, and low speed depend on a vertical orientation with the cold end of the pulse tube down to maintain the stratification of the gas in the pulse tube. The connecting tube between the PWG and the cold head in this application is usually fixed in position at the time the refrigerator is installed. Stirling type pulse tube refrigerators operating at higher speeds and temperatures and having smaller diameter pulse tubes can operate at other orientations because the gas does not have time to stratify. They are widely used in space where there is no gravitational force to stratify the gas in the pulse tube.

The primary purpose for having a connecting line between a PWG and a pulse tube cold head in most applications is to isolate vibration being transmitted from the PWG to the pulse tube cold head. Other reasons are consideration of mounting constraints, isolation of electromagnetic interference from the PWG, or isolation of the PWG from magnetic fields. Connecting lines that use corrugated hoses serve both to isolate vibration and provide flexibility in mounting the valve mechanism in a GM type pulse tube.

U.S. Pat. No. 7,628,022 by Spoor (the "'022 patent") describes a Split Stirling type pulse tube that uses a corrugated flex hose with a braided cover (col 4 L 32) to connect the PWG to the cold head. The '022 patent describes the PWG as an "acoustic power source." The primary purpose of the connecting line is to separate the PWG from the cold head and the main claim of the patent specifies a minimum length based on the operating frequency.

There are two types of phase shifting mechanisms being used today in GM type pulse tubes operating near 4 K. U.S. Pat. No. 9,157,668 by Xu (the "'668 patent") describes a basic Double Inlet pulse tube to which a bleed line between a buffer volume and the compressor return line has been added. With reference to FIG. 1 of the '668 patent, the basic Double Inlet pulse tube comprises PWG components 12, V1 and V2, connecting line 20, and the rest of the components which comprise the cold head. Without the addition of the bleed line only one line, 20, is needed to connect the PWG to the cold head. This is also true for a two stage 4 K pulse tube as shown in FIG. 8 of the '668 patent, which shows line 220 as the connecting line between the PWG and the regenerator, 242. U.S. Pat. No. 10,066,855 by Xu (the "'855 patent") describes a Four Valve pulse tube. This name derives from the phase shifting mechanism comprising two valves in the PWG to cycle gas to one or a series of regenerators and two valves for a first stage pulse tube. The '855 patent describes flow control mechanisms to balance the flow of gas to second and third stage pulse tubes, each of which requires an additional pair of valves. With reference to FIG. 1 of the '855 patent the pulse tube comprises PWG components compressor 212, valves V1 through V6 and the connecting piping, connecting lines 220, 230, and 299, and the rest of the components which comprise the two stage cold head. The connecting line between the PWG and the regenerator, 220, carries more than 90% of the flow to the cold head and is, therefore, much larger than connecting lines 230 and 299. A two stage Four Valve pulse tube that requires three connecting lines might seem to be at a disadvantage with respect to a Double Inlet pulse tube; however, the Four Valve pulse tube does not require a buffer volume. The buffer volume of a Double Inlet pulse tube can be relatively large and may have to be mounted separate from the cold head, which requires a second relatively small connecting line.

One of the current applications for a two stage GM type pulse having a separate PWG and providing about 1 W of cooling near 4 K is for cooling a superconducting magnet that produces a high magnetic field for performing nuclear magnetic resonance (NMR) studies. Three patents assigned to Bruker BioSpin GmbH address problems in using a 4 K pulse tube cold head mounted in the neck tube of a NMR cryostat where the 4 K pulse tube cold head cools a cold shield and condenses helium boil-off. U.S. Pat. No. 9,995,510 by Wikus (the "'510 patent") describes a novel connecting line that reduces the cyclical force on the cryostat due to the pressure cycling of the gas in the connecting line, at 1 to 2 Hz. FIG. 7 of the '510 patent shows a standard corrugated hose, which typically has a SS braided sleeve over it to prevent it from stretching, and is described as isolating high frequency vibration. U.S. Pat. No. 9,982,840 by Wikus (the "'840 patent") describes another aspect of isolating the vibration of a two stage 4 K GM type pulse having a PWG separated from the cold head by a corrugated hose. The cold head is mounted in the neck tube of cryostat using a flexible diaphragm to seal the warm flange of the pulse tube to the warm flange of the neck tube. The diaphragm seals the helium in the neck tube from atmosphere and the helium is at a slightly higher pressure than the atmosphere so that it tends to "float" the cold head. US Patent No. 10,401,447 by Wikus (the "'447 patent") adds to the cold head of the '840 patent a pivot bearing that supports the cold head in the neck tube in such a way that the pulsing force from the connecting tube allows it to swing back and forth within the neck tube a small amount, e.g. 1°, without transmitting the force to the cryostat. FIG. 5 of the '447 patent shows a connecting line comprising a straight section of tube in series with a corrugated hose section.

A paper titled "Development of High Efficiency 4 K two-stage Pulse Tube Cryocoolers with Split Valve Unit," by K. Nakano and M. Y. Xu, published in Advances in Cryogenic Engineering, 2012, compares the performance for 1 m long corrugated connecting lines of different diameters. Photographs of integral and split-type GM pulse tube expanders are shown. The split valve unit operates at higher temperatures with the same heat loads because of losses due to the void volume and pressure drop in the connecting line between the valve unit and the cold head. Displacement at the cold ends of the first and second stages due to pressure cycling at 1.7 Hz was measured to be +/−10.3 μm and +/−14.6 μm respectively for the split valve unit. A comparison of the vibration of the integral vs split valve motor at frequencies up to 200 Hz showed only a small difference at 1.7 Hz but a reduction of as much as 10 times for the split valve motor at higher frequencies.

The present GM type pulse tube refrigerators that split the PWG from the cold head use commercially available corrugated SS hose with a braided SS cover for the connecting line. This hose provides flexibility in mounting the valve unit and reduces the vibration transmitted from the valve unit to the cold head.

SUMMARY

Embodiments of the present invention provide a reduction of losses in the connecting line between the PWG and the cold head of a GM type pulse tube refrigerator, while maintaining or improving upon the desirable features of the present corrugated hose connecting line including vibration isolation, separation distance, and mounting convenience. The basic means of embodiments reduce the internal void volume of the convolutions in a corrugated hose in combination with reducing the number of corrugations, adding fillers to the void volumes, and providing vibration absorbing coatings.

These advantages may be achieved by, for example, a Pulse Tube cryogenic refrigerator that includes a connecting line between a Pressure Wave Generator (PWG) and a pulse tube cold head, in which the connecting line includes a metal hose having corrugations that allow the hose to bend at least ninety degrees (90°), the outside diameter (OD) of the corrugations being at least 40% more than the inside diameter (ID), and in which an inner volume of the hose is no greater than 33% of a core volume of the hose. In embodiments, the outer convolutions that form the inner volumes of the corrugations are more closely spaced than the inner corrugations that form the outer volumes of the corrugations. In embodiments, the hose comprises corrugated sections having the corrugations and at least one straight tubing section. The outer convolutions that form the inner volumes of the metal hose are spaced apart by the straight tubing section having the same or smaller ID as that of the convolutions. In embodiments, inner volumes of the corrugations that are defined by outer convolutions are at least partially filled with an elastomer. In embodiments, the exterior of the metal hose is coated with an elastomer. In embodiments, the exterior of the metal hose is reinforced with a braided cover.

These advantages may be achieved by, for example, a Pulse Tube cryogenic refrigerator that includes a connecting line between a Pressure Wave Generator (PWG) and a pulse tube cold head, in which the connecting line includes a bendable metal tube and a coupling that has an elastomer seal which prevents metallic contact between the PWG and the cold head.

BRIEF DESCRIPTION OF THE DRAWINGS

Embodiments are illustrated by the following drawings, in which the same or similar numbers show the same or equivalent part.

DESCRIPTIONS OF THE PREFERRED EMBODIMENTS

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
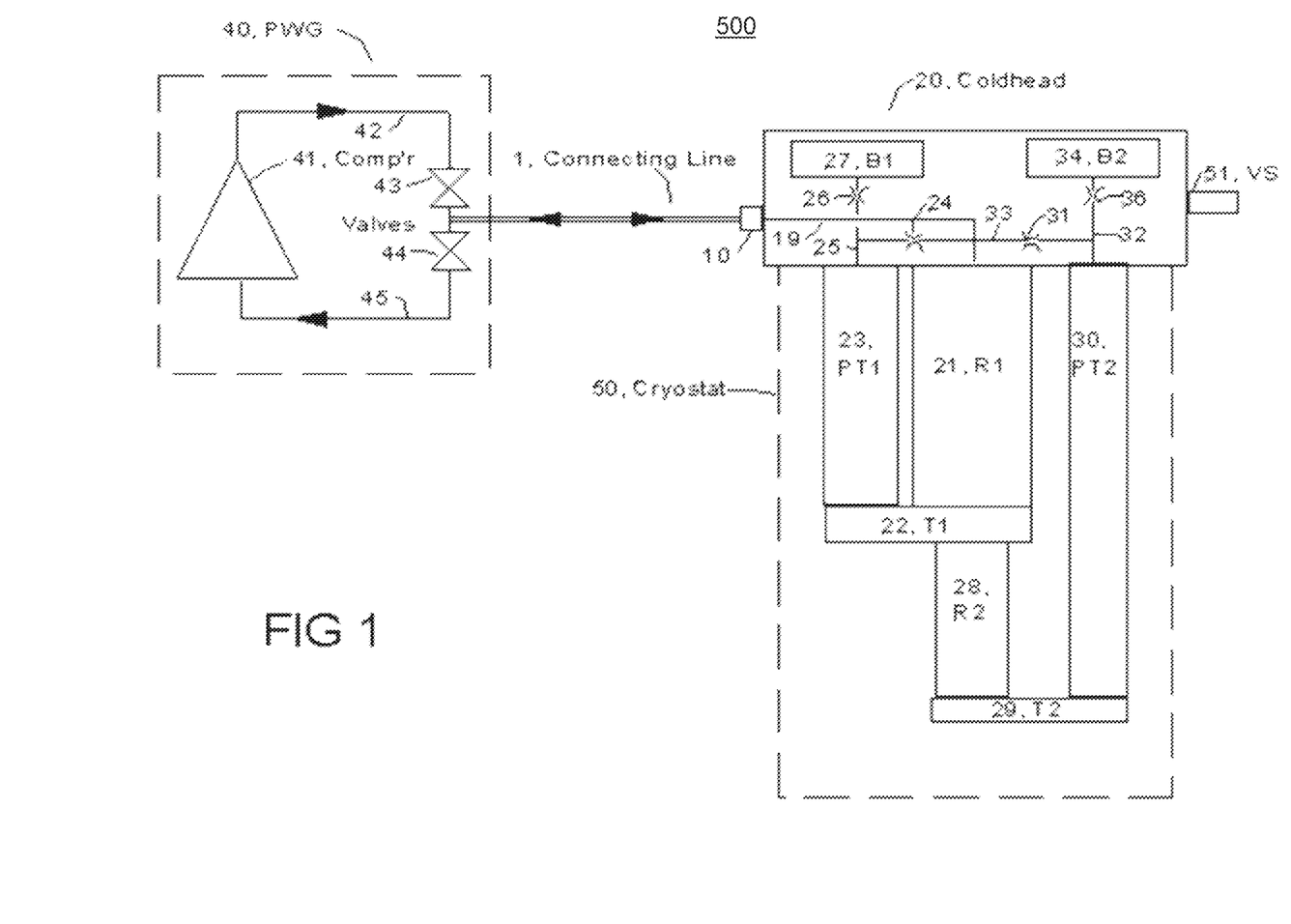
FIG. 1 shows a schematic of a Double Inlet GM type two stage pulse tube refrigerator that shows the relationship of the connecting line to the PWG and the cold head.

FIG. 1 shows a schematic of a Double Inlet GM type two stage pulse tube refrigerator 500 that shows the relationship of connecting line 1 to Pressure Wave Generator 40, and cold head 20. PWG 40 is comprised of compressor 41, high pressure supply line 42, high pressure valve 43, low pressure valve 44, and low pressure return line 45. Valves 43 and 44 are typically incorporated as ports in a rotary valve assembly that is driven by a valve motor. The valve motor is the primary source of the high frequency vibration that can be transmitted to the cold head through connecting line 1. Supply and return lines 42 and 45 are typically flex hoses that allow compressor 41 to be separated from the valve motor assembly. Pulse tube cold head 20 is shown mounted on the top of cryostat 50 which contains the device being cooled. Cryostat 50 also provides the insulation needed to minimize the refrigerator heat load. The components of cold head 20 that are at ambient temperature are the follow: line 19, which connects connecting line 1 to the warm end of first stage regenerator 21 (R1), orifice 24, and orifice 31; line 25, which connects orifice 24 to the warm end of first stage pulse tube 23 (PT1), first stage buffer volume 27 (B1), through orifice 26; and, line 32, which connects orifice 31 to the warm end of second stage pulse tube 30 (PT2), second stage buffer volume 34 (B2), through orifice 36. Cold components include first stage heat station 22 at temperature T1, second stage regenerator 28 (R2), and second stage heat station 29 at temperature T2.

The paper cited above by K. Nakano and M. Y. Xu describes a two stage GM type pulse tube with 1 m long connecting lines. The pulse tube refrigerator described in this paper is representative of the use of the novel connecting line improvements included in this invention. It incorporates a compressor drawing 6.4 kW at 50 Hz charged with helium at 1.65 MPa and gas cycling to the cold head at 1.7 Hz. The connecting lines are standard braided corrugated hoses, the hose to the regenerator having an ID of 9.5 mm and the hose to the first stage pulse tube having an ID of 4.0 mm. First stage temperature T1 was measured to be 45.4 K with a heat load of 40 W and second stage temperature T2 was measured to be 4.05 K with a heat load of 1.0 W. With the valve mechanism integral to the cold head the temperatures at the same conditions were 37.0 K and 3.86 K respectively. Applications that use connecting lines in accordance with this invention will use compressors that draw between about 1 to 15 kW and operate between temperatures of about 3 to 80 K. Connecting lines will be less than about 1 m long, have inside diameters ("IDs") between 3 and 15 mm, and typically have a bend of up to ninety degrees (90°). It is noted that the vibration measurement cited above was made by sensor 51 (VS) on the cold head opposite the connecting line connector 10.

Figure 2:
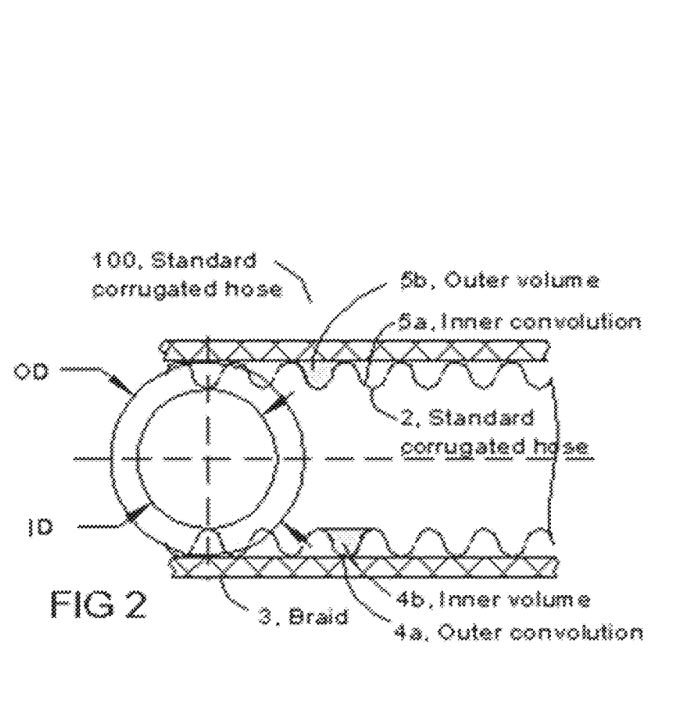
FIG. 2 shows a section of a commercially available corrugated hose.

FIG. 2 shows a section of the commercially available corrugated hose 100, presently being used for the connecting line. One of the manufacturers of this type of hose, Hose Master, describes the process of making the hose as forming a strip of metal, typically stainless steel SS, into a tube, seam welding it, then mechanically forming the convolutions of the hose. Hose Master also makes corrugated hoses by forming a long strip of SS into a single convolution, coiling it into a spiral, and seam welding the edges. Standard corrugated hose 2 has SS braided cover 3 that prevents the thin walled tubing from stretching when it is pressurized. Without the braided cover the hose has a typical pressure limit in the range of 0.1 to 0.3 MPa while with one layer of braided cover the pressure limit range is typically 5 to 10 MPa. The hose has an outside diameter (OD), that is 1.4 times the inside diameter (ID). The outer convolution 4a partially encloses inner volume 4b which represents void volume when the pressure in the line cycles between high and low pressure. This void volume reduces the amount of gas that reaches the cold head by the amount that pressurizes and depressurizes inner volume 4b. The standard hose has an excess volume ratio (percentage of volume in the convolution/core volume) of about 50%, where the core volume is the volume in the ID times the length of the connecting line. In other words, in this standard hose the void volume is about 50% of the core volume. Inner convolution 5a encloses outer convolution volume 5b. The convolutions act as a series of rounded orifices that increase the pressure drop when gas flows through the hose relative to a smooth walled tube of the same ID.

Figure 3:
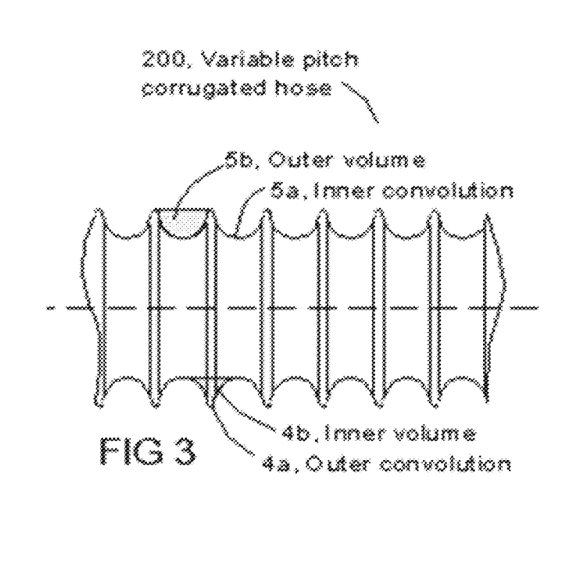
FIG. 3 shows a section of a variable pitch corrugated hose in accordance with this invention.

FIG. 3 shows a section of a variable pitch corrugated hose in accordance with this invention in which the distance between the inner convolutions 5a remains the same as the standard corrugated hose but the radius of the outer convolutions 4a is smaller than the inner convolutions 5a. For the case where the radius of the inner convolutions 5a is six (6) times greater than the radius of the outer convolutions 4a, the inner volume 4b is about 27% of the core volume and the pressure drop is reduced slightly because of the larger radius of the inner convolutions 5a. For the case where the radius of the inner convolutions 5a is three (3) times greater than the radius of the outer convolutions 4a, the inner volume 4b is about 33% of the core volume. The excess volume ratio of the corrugated hose of the disclosed invention is no greater than 33%. Alternatively, the excess volume ratio of the corrugated hose of the disclosed invention may be no greater than 27%.

Figure 4:
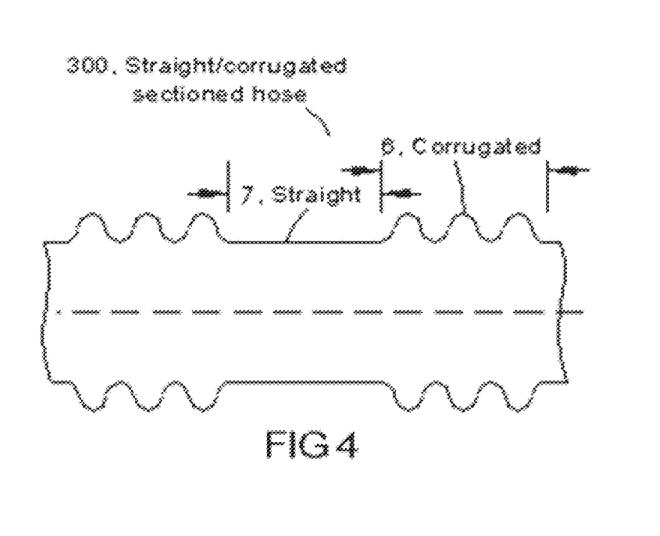
FIG. 4 shows a section of a connecting line that combines sections of corrugated hose with sections of straight tubing.

FIG. 4 shows a section of a connecting line identified as "Straight/corrugated section hose" 300 that combines sections of corrugated hose 6 with sections of straight tubing 7. The paper cited above by K. Nakano and M. Y. Xu used corrugated hoses that would have a length of two and half (2.5) times the ID of the hose in a ninety degree (90°) bend. The 9.5 mm ID tube that was used would have less than 3 cm of length in the bend, which is three percent (3%) of its total length. Multiple sections of corrugated hose 6 spaced apart with straight tubing 7 will have less internal volume and lower pressure drop than standard corrugated hose 2. Corrugated hose 6 spaced apart with straight tubing 7 might however transmit more vibration. It is noted that the ID of corrugated hose is larger than the ID of bendable tubing for equivalent pressure drop. This increase in ID adds to the void volume in connecting line 1. The ID of straight section 7 can be less than the ID of corrugated section 6.

Figure 5:
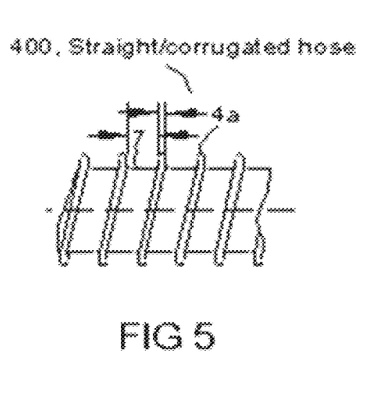
FIG. 5 shows a section of a connecting line that combines straight sections between convolutions.

The configuration shown in FIG. 5, identified as "Straight/corrugated hose" 400, shows a section of a connecting line that combines straight sections 7 between convolutions 4a. Like the hose, corrugation 6 spaced apart with straight tubing 7 will have less internal volume and lower pressure drop than standard corrugated hose 2 but might however transmit more vibration.

Figure 6:
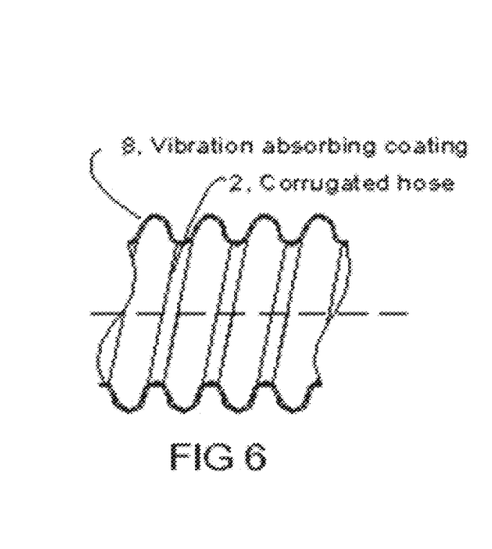
FIG. 6 shows a section of a commercially available corrugated hose with a vibration absorbent coating.

FIG. 6 shows a section of a commercially available standard corrugated hose 2 with a vibration absorbent coating 8. Such a coating can be applied to any of the connecting line configurations to reduce vibration being transmitted from the PWG to the cold head.

Figure 7A:
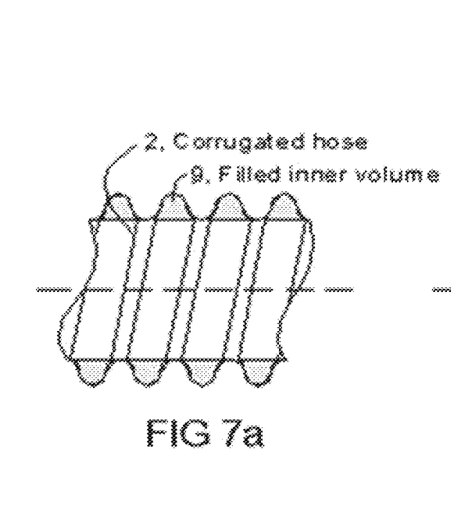
FIG. 7a shows a section of a commercially available corrugated hose with an elastomer filling the internal volumes of the corrugations.
Figure 7B:
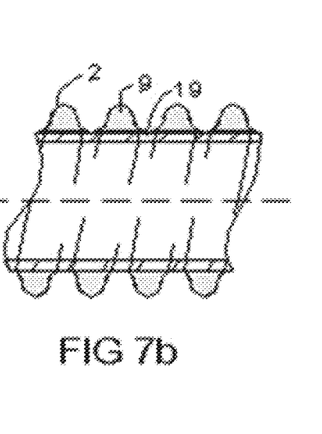
FIG. 7b shows a section of a commercially available corrugated hose with an elastomer filling the internal volumes of the corrugations with tube lining the ID.

FIG. 7a shows a section of a standard corrugated hose 2 with an elastomer 9 filling the internal volumes of the corrugations. Such a filling, even if it only partially fills the outer convolution, will reduce the void volume. If elastomer 9 completely fills outer convolution 9 and provides a smooth bore then the loss of cooling due to void volume in the connecting line is eliminated and the loss due to pressure drop is reduced. The elastomer will also absorb vibration. FIG. 7b adds liner tube 19 to the ID. In this case the core volume is based on the ID of the tube. In either design the ratio of the inner volume to the core volume may be 1.

Figure 8:
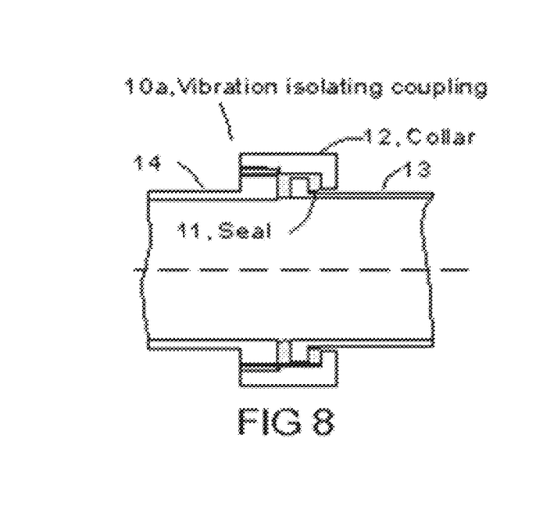
FIG. 8 shows a section of a coupling that isolates the high frequency vibration of the PWG from the cold head by means of an elastomer seal that prevents metal to metal contact.

FIG. 8 shows vibration isolating coupling 10a that isolates the high frequency vibration of the PWG from the cold head by means of an elastomer seal 11 that prevents metal to metal contact between connecting tube 14, that has a threaded lip, and connecting tube 13 that has a lip to retain coupling collar 12.

Figure 9:
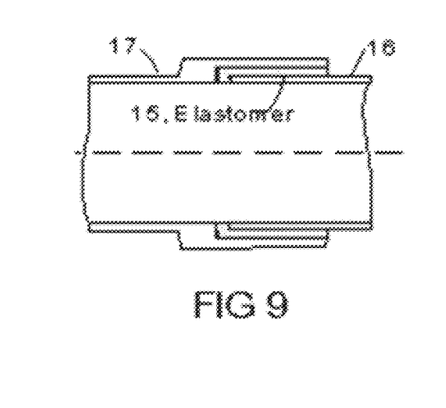
FIG. 9 shows a section of a connecting line that has an elastomer bond, between two sections of the connecting line, that isolates the high frequency vibration of the PWG from the cold head.

FIG. 9 shows a section of a connecting line that has an elastomer bond 15 between two sections of the line 17 and 18 that isolates the high frequency vibration of the PWG from the cold head. Connecting line 1 could be made of bendable copper or SS tubing and incorporate such an elastomer bonded coupling that would isolate high frequency vibration and reduce low frequency vibration associated with expansion and contraction of the line due to pressure cycling.

The terms and descriptions used herein are set forth by way of illustration only and are not meant as limitations. Those skilled in the art will recognize that many variations are possible within the spirit and scope of the invention and the embodiments described herein.

What is claimed is:

1. A pulse tube cryogenic refrigerator comprising:
a connecting line between a Pressure Wave Generator (PWG) and a pulse tube cold head, wherein the connecting line comprises a metal hose having corrugations that allow the hose to bend at least ninety degrees (90°), an outside diameter (OD) of the corrugations being at least 40% more than an inside diameter (ID) of the corrugations, and wherein an inner volume of the hose is no greater than 33% of a core volume of the hose.

2. The pulse tube cryogenic refrigerator of claim 1 wherein a radius of outer convolutions that form inner volumes of the corrugation is smaller than a radius of inner convolutions that form outer volumes of the corrugation.

3. The pulse tube cryogenic refrigerator of claim 1 wherein the hose comprises corrugated sections having the corrugations and at least one straight tubing section, and outer convolutions that form inner volumes of the corrugations are spaced apart by the straight tubing section having the same or smaller ID as that of the convolutions.

4. The pulse tube cryogenic refrigerator of claim 1 wherein inner volumes of the corrugations that are defined by outer convolutions are at least partially filled with an elastomer.

5. The pulse tube cryogenic refrigerator of claim 1 wherein an exterior of the metal hose is coated with an elastomer.

6. The pulse tube cryogenic refrigerator of claim 1 wherein an exterior of the metal hose is reinforced with a braided cover.

7. A pulse tube cryogenic refrigerator comprising:
a connecting line between a Pressure Wave Generator (PWG) and a pulse tube cold head, wherein the connecting line comprises a bendable metal tube and a coupling that has an elastomer seal which prevents metallic contact between the PWG and the pulse tube cold head.

8. The pulse tube cryogenic refrigerator of claim 7 wherein the elastomer seal is disposed between coupling portions of two sections of the metal tube.

* * * * *